United States Patent [19]
Meyn

[11] 3,879,517
[45] *Apr. 22, 1975

[54] METHOD FOR MAKING A DUAL SEAL INSULATOR FOR MULTIPLE CONDUCTOR CONNECTORS

[75] Inventor: John E. Meyn, Anaheim, Calif.

[73] Assignee: Microdot Inc., South Pasadena, Calif.

[ * ] Notice: The portion of the term of this patent subsequent to Aug. 25, 1987, has been disclaimed.

[22] Filed: Dec. 26, 1972

[21] Appl. No.: 317,926

[52] U.S. Cl. ............... 264/135; 264/137; 264/272; 264/273
[51] Int. Cl. ............................................. B29f 1/10
[58] Field of Search ........... 264/135, 137, 272, 273, 264/275

[56] References Cited
UNITED STATES PATENTS

| | | | |
|---|---|---|---|
| 3,138,323 | 6/1964 | Yolin | 264/250 X |
| 3,398,222 | 8/1968 | Kaufman | 264/273 X |
| 3,525,786 | 8/1970 | Meyn | 264/135 |
| 3,680,187 | 8/1972 | Murray | 264/275 |

Primary Examiner—Richard R. Kucia
Attorney, Agent, or Firm—Harness, Dickey & Pierce

[57] ABSTRACT

A method for making a dual seal insulator including an insert and a pair of elastomeric seals each united to one of the ends of the insert, wherein portions of the insert and the seals define a plurality of bores. The insulator is formed by mounting the insert in a mold to form a pair of mold cavities at each end of the insert and placing core pins in the bores of the insert so that they extend from the insert across the cavities. A keyway, disposed longitudinally on the circumference of the insert between the ends thereof, cooperates with the enclosure to define a passage between the mold cavities. An elastomeric material is pressed into one of the cavities so that a portion of the material is forced through the passage into the other of the cavities. In this manner, the pair of elastomeric seals is simultaneously molded at opposite ends of the insert. The insulator is then cured and removed from the enclosure and the core pins are extracted from the bores.

17 Claims, 4 Drawing Figures

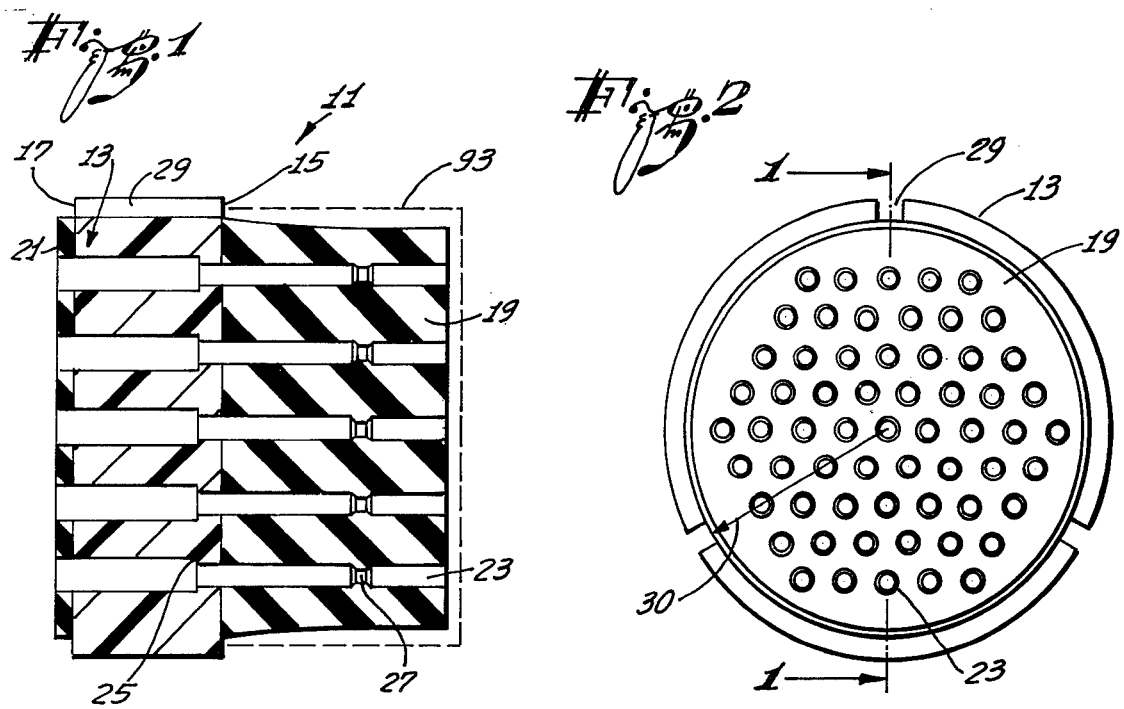
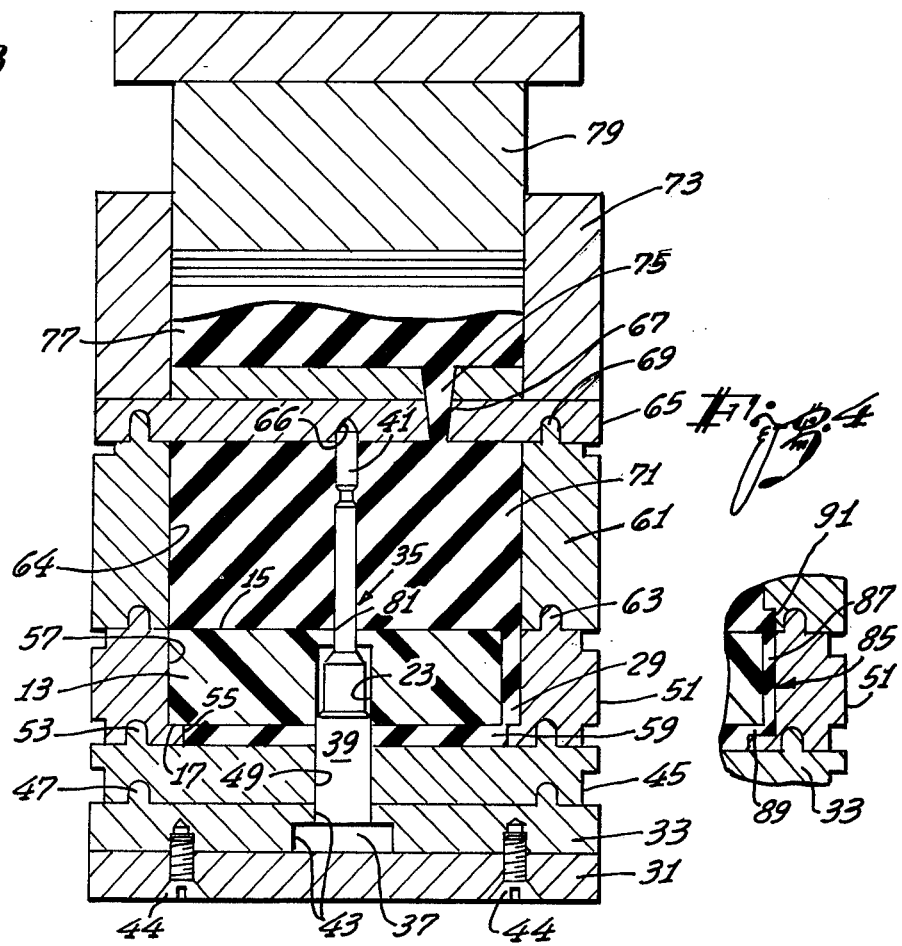

METHOD FOR MAKING A DUAL SEAL INSULATOR FOR MULTIPLE CONDUCTOR CONNECTORS

BACKGROUND OF THE INVENTION

1. Field of the Invention

This invention relates generally to methods for molding seals on opposite ends of an insert to form an insulator for use in multiple conductor connectors.

2. Description of the Prior Art

Multiple conductor electrical connectors are used for providing continuity between associated conductors in a pair of multiple conductor cables. Each of the connectors includes a pair of opposing registerable portions which are individually connected to the end of one of the pair of cables. The opposing portions each have included an encasing member and an insert disposed therein. A grommet seal has been united with the forward end of the insert and a wafer seal has been united with the rearward end of the insert.

The insert in combination with the grommet seal and the wafer seal form a dual seal insulator having a plurality of bores extending longitudinally with the respective cable. A plurality of control elements are connected individually to one of the conductors and resiliently fixed within an associated one of the bores by the grommet seal. The wafer seal provides an insulating face at the rear of the insulator.

Multiple conductor insulators having an insert united with a grommet seal have been fabricated in accordance with a method disclosed by John E. Meyn in U.S. Pat. No. 3,525,786 and assigned of record to the assignee of record of the present application. That patent discloses the mounting of a multiplebore insert in a first mold wherein a first mold cavity is defined at one end of the insert. A multiplicity of core pins are placed into each of the bores of the insert to extend across the mold cavity. One of the ends of the insert is coated with uncured thermal setting adhesive and, with the mold heated, an uncured elastomeric material is forced under heat and pressure into the first mold cavity to form the grommet seal around the core pins. By curing the elastomeric material and the insert under pressure, the seal is bonded to the face of the insert.

In cases where it has been desirable to have a seal at both ends of the insert, the process has been repeated. Thus, the insert has been mounted in a second mold which forms a second mold cavity with the opposite end of the insert, and the core pins extend across the second mold cavity. The opposite end of the insert is coated with the uncured thermal setting adhesive and the elastomeric material is extruded under heat and pressure into the second mold cavity to form a second seal.

It can be appreciated that it is desirable to unite the insert with the grommet and wafer seals in a subassembly which provides for the alignment of the bores within the insulators and seals. However, the formation of a seal at each end of the insulator has called for an iteration of each step in the process. For this reason, the fabrication of the composite bodies has been relatively time consuming and expensive. It is desirable to equalize the bonding of the seals to the insert but it has been difficult to maintain identical molding pressures in the separate molding operation. Furthermore, since separate molds have been used to form each of the seals, there has been an additional burden in cleaning the molds.

SUMMARY OF THE INVENTION

The foregoing deficiencies of the prior art have been overcome by the present invention which provides for the simultaneous molding of the first and second seals. An insert having multiple bores extending longitudinally between its ends is provided with keyways spaced on the circumference of the insert to maintain its radial alignment within a connector. The insert is enclosed in a mold so that a first mold cavity is defined at one end of the insert and a second mold cavity is defined at the other end of the insulator. Contact elements can be mounted in at least some of the bores of the insert to extend through the first and second mold cavities.

A passage which is defined at least in part by the insert connects the first mold cavity with the second mold cavity. As an elastomeric material is extruded under heat and pressure into one of the mold cavities, a portion of the material is forced through the passage into the other mold cavity whereby the seals are molded simultaneously. A longitudinal recess in the wall of the mold can combine with the side of the insert to define the passage between the first and second mold cavities. However, the passage is desirably provided by the keyways which extend longitudinally between the ends of the insert.

It will be noted that the temperature and pressure which accompanies the extruding of the elastomeric material is the same for each of the seals so that the seals have identical bonding characteristics. Also, since the dual seal insulators can be formed using a single mold, there is less of an investment in equipment. Furthermore, since the two seals are molded simultaneously, there is only one cleanup operation. Of particular importance is the savings in time which can result from simultaneously molding the grommet and the wafer seals. For example, the simultaneous molding process typically provides a 40% savings in time over the processes of the prior art.

Further features of the invention will appear from the following description in which the preferred embodiments of the invention have been set forth in detail in conjunction with the accompanying drawings.

DESCRIPTION OF THE DRAWINGS

FIG. 1 is a side elevational view of the presently preferred embodiment of the dual seal insulator, the view being in cross section through the axis of the composite body;

FIG. 2 is a front elevational view of the embodiment shown in FIG. 1; and

FIG. 3 is a sectional view of apparatus which may be employed for the molding of the dual seal insulator shown in FIGS. 1 and 2, wherein the area of the bore and the pin is substantially enlarged; and FIG. 4 illustrates a fragmentary sectional view of another apparatus that may be employed for the molding of the dual seal insulator.

DESCRIPTION OF PREFERRED EMBODIMENTS

The concepts of this invention can be embodied in the configuration shown in FIG. 1 wherein a dual seal insulator is shown generally at 11. The dual seal insulator is a composite body including an insert 13, a grommet seal 19, and a wafer seal 21. The insert 13 is defined in part by a first end face 15 and a second end face 17. The grommet seal 19 is preferably bonded to the first end face 15, and the wafer seal 21 is preferably bonded to the second end face 19 to form a composite body with the insert 13.

The insert 13 can be a rigid body having insulating properties which is preferably made of a thermal setting resin such as epoxy reinforced by glass fibers. In addition, materials such as diallyl phthalate, melamine, phenol, formaldehyde, resin, and alkyd molding compounds can be used to form the insert 13. The grommet and wafer seals 19 and 21 are preferably made of silicone rubber but other commonly known elastomers may be used such as butyl, nitrile, neoprene, SBR, EPR, or natural rubber.

The dual seal insulator 11 has a plurality of bores, such as the bore 23, which extend longitudinally through the insert 13 and the seals 19 and 21. The bore 23 can include a shoulder 25 defined by the insert 13 and providing the bore 23 with a step configuration having a larger diameter in the wafer seal 21 and a smaller diameter in the grommet seal 19. In addition, the bore 23 can include a circumferential restriction 27 in the elastomeric material forming the grommet seal 19. By virtue of the resilient yieldability of the elastomeric material, the circumferential restriction 27 functions in the manner of an O-ring. Thus, in a multiple conductor electrical connector, a contact element having an enlarged shank narrowing to form a pin can be inserted into the bore 23 so that the shank abuts the shoulder 25 and the circumferential restriction 27 creates a seal with the pin of the contact element. It can be appreciated that the circumferential restriction 27 also functions to yieldably retain the contact element within the associated bore 23.

A frontal view of the dual seal insulator 11 and the bores 23 is shown in FIG. 2. A plurality of slots such as the keyways 29 are longitudinally disposed at the circumference of the insulator 13 on an inside radius 30. Each of the keyways 29 cooperates with an associated key in the connector (not shown) to maintain the angular disposition of the dual seal insulator 11 within the connector.

To carry out the contemplated method of fabrication the insert 13 can be molded in advance and its end faces 15 and 17 coated with an adhesive primer that is compatible with the materials used in the insert 13 and the seals 19 and 21. For example, in the preferred embodiment wherein the insert 13 is formed of an epoxy material and the seals are formed from a silicone rubber, the adhesive primer can include the following ingredients and parts by weight:

| | |
|---|---|
| Diallyl phthalate | 90 |
| Diallyl phthalate monomer | 10 |
| Tertiary butyl perbenzoate | 5 |
| Toluol | 150 |
| Methyl ethyl ketone | 50 |

Desirably, two coats of adhesive primer are applied to each of the end faces 15 and 17, and the first coat is cured by baking at a temperature of 300°F for 15 minutes.

Further fabrication of the dual seal insulator 11 can be accomplished by use of a mold apparatus such as that shown in FIG. 3. A base plate 31 and a pin plate 33 cooperate to loosely hold a plurality of contact elements such as the contact element shown generally enlarged at 35. For the purposes of illustration the single contact element 35 is shown in FIG. 3 it being understood that there can be a contact element for each of the bores 23 in the insert 13. The contact element 35 is provided with a ferrule 37, a shank 39, and a pin 41 which have progressively smaller diameters. The pin plate 33 is provided with a bore 43 for each of the contact elements 35, the bore 43 having a larger diameter in contact with the base plate 31 and a smaller diameter in contact with the shank 39. The contact elements 35 can be mounted in the bores 43 and the pin plate 33 fixed to the base plate 31 by a multiplicity of screws 44.

An ejection plate 45 can be aligned with the pin plate 33 by the use of a plurality of dowel pins 47. The ejection plate 45 can be provided with a bore 49 in substantially close relationship with each of the contact elements 35.

A first cylinder 51 can be aligned with the ejection plate 45 by the use of dowel pins 53. In the preferred embodiment, the first cylinder 51 is provided with first wall portion 55 of relatively smaller diameter extending from the ejection plate 45, and second wall portions 57 of relatively larger diameter extending from the first wall portions 55.

In the preferred method of operating the apparatus shown in FIG. 3, the insert 13 is mounted over the contact elements 35 to occupy that portion of the cylinder 51 defined by the second wall portions 57. In this manner a first mold cavity 59 is defined by the end face 17 of the insert 13, the first wall portions 55, and the ejection plate 45. With the insert 13 mounted over the contact elements 35, the shanks 39 of each of the contact elements 35 extend from the pin plate 33, across the first mold cavity 59 and into the insert 13. In this manner, the contact elements 35 define interstices among the shanks 39 within the first cavity 59. The radius of the first wall portion 55 is preferably less than the radius of the second wall portion 57 but greater than the inside radius 30 (FIG. 2) of the keyways 29. With this configuration, each of the keyways 29 will provide a passage into the first mold cavity.

A second cylinder 61 can be seated on the cylinder 51 and aligned therewith by the use of dowel pin 63. The second cylinder 61 can be provided with a cylindrical inner surface 64 concentric with the first and second wall portions 55 and 57, respectively, and having a diameter substantially equivalent to the diameter of the second wall portions 57.

A top plate 65 can be mounted on a plurality of dowel pins 69 which extend from the second cylinder 61. In this manner, a second mold cavity 71 is defined by the top plate 65, the inner surface 64 of the second cylinder 61, and the first end face 15 of the insert 13. The top plate 65 can be provided with an opening 67 extending into the second mold cavity 71 and a plurality of recesses 66 each receiving the head 41 of one of the contact elements 35. With the insert 13 disposed over the contact elements 35, the heads 41 of the contact elements 35 extend from the insert 13, across the second mold cavity 71, into the recesses 66. In this manner, the contact elements 35 define interstices among the heads 41 within the second mold cavity 71. It can be appreciated that since the inside radius of the keyways 29 is less than the radius of either the first mold cavity 51 or the second mold cavity 71, the keyways 29 provide a passage between the cavities 51 and 71.

A pot 73 having an opening 75 in the base thereof can be placed on the top plate 65 so that the opening 67 and the opening 75 align to form a sprue. The pot 73 can be charged with an elastomeric material 77 and provided with a ram 79 capable of forcing the material 77 through the openings 75 and 67 into the second mold cavity 71 to form the grommet seal 19. With the keyways 29 each providing a passage between the second mold cavity 71 and the first mold cavity 51, a portion of the elastomeric material 77 will extend through the keyways 29 into the first mold cavity 51 to form the wafer seal 21. In this manner the grommet and wafer seals 19 and 21 respectively can be simultaneously molded under the same temperature and pressure, and with the same molding apparatus.

It can be appreciated that other means for providing a passage between first and second mold cavities 59 and 71 respectively can comprise a plurality of longitudinal recesses one of which is shown generally at 85 in FIG. 4. In this embodiment the second wall portions 57 are slotted to define a first portion 87 of the longitudinal recess 85 which combines with a portion of the circumferential surface of the insert 13 to form a passage beside the insert 13. A second portion 89 of the longitudinal recess 85 is defined by the second end face 17 and the first wall portions 55 to provide the passage with access to the first mold cavity 59. A third portion 91 of the longitudinal recess 85 can comprise a slot in the inner surface 64 of the second cylinder 61. The third portion 91 provides the passage with access to the second mold cavity 71. This embodiment of the mold apparatus is preferred when the insert 13 does not include keyways 29.

In either of the foregoing embodiments, each of the bores 23 in the insert 13 is occupied by a portion of one of the contact elements 35. To prevent the elastomeric material 77 from entering the bores 23 of the insert 13, it is desirable to maintain relatively close tolerances at least where the contact elements 35 enter and leave the insert 13. For example, the pins 41 of the contact elements 35 can be provided with a radius 0.0003 inches less than the radius of the bores 23 to establish a shut off point 81 where the pins extend from the insert 13 into the second cavity 71. Similarly, the shanks 39 of the contact elements 35 can be provided with a radius 0.0003 inches less than the radius of the bores 23 to establish a shut off point 83 where the shank 39 extends from the insert 13 into the first cavity 51.

In the preferred embodiment an initial downward pressure by the ram 79 of 700 pounds per square inch will cause a portion of the elastomeric material 77 to pass through the second mold cavity 71 and the keyways 29 into the first mold cavity 59. After the cavities 71 and 59 have been filled, the pressure applied by the ram 79 can be increased to 1000 pounds per square inch for approximately 15 seconds. At the end of this period of time the ram 79 can be allowed to drift for a cure period of approximately 5 minutes after which the first cylinder 51 and the second cylinder 61 can be removed from the insulator 11. Then insulator 11 can be baked at a temperature such as of 350°F for a final cure period of approximately 8 hours. Finally, the dual seal insulator 11 can be removed from the contact elements 35 by lifting the ejection plate 45 from the pin plate 33.

During the final cure period, the elastomeric material will shrink to the desired tapered configuration shown best in FIG. 1 from the dimensions of the second mold cavity 71 shown by dotted lines 93. The diameter of bores 23 will not shrink, however, due to the presence of the contact elements 35 within the bores 23 during the cure period.

It can be appreciated that this method and apparatus for fabricating the dual seal insulator 11 offers significant advantages over the methods and molding apparatus of the prior art. A significant advantage is associated with the simultaneous fabrication of the grommet seal 19 and the waver seal 21 which can provide a savings in time of approximately 40%. The savings in time can be accounted for in part by the fact that only a single fabricating apparatus need be cleaned after the insulator 11 is fabricated.

Furthermore, the prior art methods of molding relied upon different molds for each of the seals 19 and 21. Thus, the single mold disclosed herein provides a significant savings in molding. Only a single pot need be charged with the elastomeric material 77 and a single charge can be sufficient to fill both of the mold cavities 59 and 71.

These savings in time and equipment can be realized without significantly altering the configuration of the insert 13. The keyways 29 which are relied upon to maintain the configuration of the composite body 11 within the connector can provide passage means for connecting the first mold cavity 59 with the second mold 71. By using the existing keyways 29 as disclosed herein, the grommet and the wafer seals 19 and 21, respectively, can be molded simultaneously.

It can also be appreciated that the pressure which is applied to the elastomeric material 77 will be the same for the grommet seal 19 and the wafer seal 21 if they are simultaneously fabricated. This can assure greater uniformity in the bonding of the seals 19 and 21 to the insert 13. In this way, the grommet seal 19 and the wafer seal 21 will be maintained in firmly bonded relationship with the insert 13 even when considerable forces such as shear forces are applied to the seals.

Although this application has been disclosed and illustrated with reference to a particular embodiment, the principles involved are susceptible of numerous other applications which will be apparent to persons skilled in the art. The invention is therefore to be limited only as indicated by the scope of the appended claims.

I claim:
1. A method of fabricating a composite body having a rigid plastic insulator with an elastomeric grommet seal at one end of the insulator and a wafer seal at the other end of the insulator, the composite body having multiple bores extending through the grommet and wafer seals and the insulator, the method including the steps of:
   molding the rigid insulator of plastic material with multiple bores extending through the insulator between first and second end faces of the insulator;
   coating the first and second end faces of the insulator with an uncured thermosetting adhesive having adhesive properties compatible with the materials of the insulator and the grommet and wafer seals;
   enclosing the insulator in a mold to form with the first end face of the insulator a first mold cavity having substantially the configuration desired for the grommet seal, and to form with the second end face of the insulator a second mold cavity having substantially the configuration desired for the wafer seal, the first mold cavity communicating with the second mold cavity through a passage formed at least in part by the insulator;

plugging at least some of the bores of the insulator with a plurality of core pins each having a length sufficient to permit the core pins to extend beyond both the first and second end faces of the insulator;

depositing an uncured thermosetting elastomeric material in one of the first and second mold cavities to surround the core pins and fill the one cavity, and to permit a portion of the elastomeric material to flow through the passage to surround the core pins and fill the other of the first and second cavities;

curing the thermosetting adhesive and the elastomeric material to form the composite body; and withdrawing the composite body from the mold and the core pins to permit shrinkage of the elastomeric material to the desired configurations.

2. The method recited in claim 1 wherein the passage extending between the first and second mold cavities is defined between the insulator and the mold.

3. The method recited in claim 2 wherein:

during the molding step the insulator is provided with at least one keyway extending between the first and second end faces of the insulator;

during the enclosing step at least one of the keyways defines with the mold a passage extending between the first mold cavity and the second mold cavity; whereby during the depositing step a portion of the uncured thermosetting adhesive is conducted from the one cavity through the passage to surround the core pins in the other cavity and fill the other cavity.

4. The method recited in claim 1 wherein all but at least one of the bores in the insulator are plugged by the core pins and the one bore defines a passage between the first and second mold cavities.

5. The method set forth in claim 1 wherein the insulator is formed of a material including a thermosetting resin.

6. The method recited in claim 1 wherein the insulator is formed of a material including epoxy and glass fibers.

7. The method recited in claim 1 wherein the grommet seal and the wafer seal are formed of silicon rubber.

8. The method recited in claim 7 wherein the thermosetting adhesive includes diallyl phthalate.

9. The method set forth in claim 1 wherein the plugging step includes the steps of:

mounting the core pins in a core plate with the core pins spaced in accordance with the spacing of the bores in the insulator;

aligning the pin plate with the insulator so that the core pins extend across the first mold cavity, through the bores in the insulator, and across the second mold cavity.

10. The method set forth in claim 1 wherein the core pins have circumferential recesses which appear in the first mold cavity during the depositing step, whereby the bores in the grommet seal are provided with circumferential restrictions which correspond to the circumferential recesses in the core pins.

11. The method set forth in claim 1 wherein the insulator is molded from a material selected from a group consisting of diallyl phthalate, melamine, phenol, formaldehyde, resin and alkyd molding compounds.

12. A method of fabricating a composite body including a rigid insulator with an elastomeric grommet seal at the one end thereof and a wafer seal at the other end thereof, the composite body having multiple bores extending through the grommet and wafer seals and the insulator, the method characterized by the steps of:

molding the rigid insulator with multiple bores extending through the insulator between first and second end faces of the insulator;

coating the first and second end faces of the insulator with an adhesive having properties compatible with the materials of the insulator and the grommet and wafer seals;

enclosing the insulator in a mold to form with the first end face of the insulator a first mold cavity having substantially the configuration desired for the grommet seal, and to form with the second end face of the insulator a second mold cavity having substantially the configuration desired for the wafer seal;

plugging at least some of the bores of the insulator with a plurality of core pins each having a length sufficient to permit the core pins to extend beyond both the first and second end faces of the insulator;

introducing an uncured thermosetting elastomeric material into the first mold cavity to surround the core pins in the first mold cavity and to fill the first mold cavity;

introducing an uncured thermosetting elastomeric material into the second mold cavity to surround the core pins in the second mold cavity and to fill the second mold cavity, at least a portion of the second introducing step occuring substantially simultaneously with the first introducing step;

curing the thermosetting elastomeric material to form the composite body; and withdrawing the composite body from the mold and the core pins to permit shrinkage of the elastomeric material to the desired configurations.

13. The method recited in claim 12 wherein the second introducing step includes the steps of:

conducting into the second mold cavity a portion of the elastomeric material introduced into the first mold cavity to surround the core pins in the first and second mold cavities and to fill the first and second mold cavities with the elastomeric material.

14. The method recited in claim 12 wherein during the molding of the rigid insulator, a channel is formed on the peripheral edge of the insulator and the channel defines with the mold a passage extending between the first and second mold cavities, said passage permitting the introduction of the elastomeric material into the second mold cavity during the introduction of the elastomeric material into the first mold cavity.

15. A method of fabricating a composite body including a rigid insulator with an elastomeric grommet seal at one end thereof and a wafer seal at the other end thereof, the composite body having multiple bores extending through the grommet and wafer seals and the insulator, the method characterized by the steps of:

molding the rigid insulator with passage means, including multiple bores, extending through the insulator between first and second end faces of the insulator;

coating the first and second end faces of the insulator with an adhesive having properties compatible with the materials of the insulator and the grommet and the wafer seals;

enclosing the insulator in a mold to form with the first end face of the insulator a first mold cavity having substantially the configuration desired for the grommet seal, and to form with a second end face of the insulator a second mold cavity having substantially the configuration desired for the wafer seal;

plugging a portion of the passage means, including at least some of the bores of the insulator, with at least one pin having a length sufficient to permit the pin to extend beyond both the first and second end faces of the insulator, the unplugged portions of the passage means providing a passage between the first mold cavity and the second mold cavity;

depositing an uncured thermal setting elastomeric material in one of the first and second cavities to surround the pins in the one cavity and fill the one cavity;

during at least a portion of the depositing step, conducting at least a portion of the deposited elastomeric material from the one cavity through the passage and into the other of the first and second cavities to surround the pins in the other cavity and fill the other cavity;

curing the thermal setting adhesive and the elastomeric material to form the composite body; and withdrawing the composite body from the mold and the pins to permit shrinkage of the elastomeric material to the configurations desired from the grommet seal and the wafer seal.

16. The method recited in claim 15 wherein the passage extending between the first and second mold cavities is defined between the insulator and the mold.

17. The method recited in claim 15 wherein the passage extending between the first and second mold cavities is one of the bores of the insulator.

* * * * *